United States Patent [19]

Tatara et al.

[11] Patent Number: 4,767,388
[45] Date of Patent: Aug. 30, 1988

[54] CHAIN BELT

[75] Inventors: Yuudai Tatara, Susono; Susumu Okawa, Aichi; Shigeru Okuwaki, Susono; Yasunobu Jufuku, Gotenba, all of Japan

[73] Assignee: Toyota Jidosha Kabushiki Kaisha, Aichi, Japan

[21] Appl. No.: 11,336

[22] Filed: Feb. 5, 1987

[30] Foreign Application Priority Data

Jun. 25, 1986 [JP] Japan ................. 61-149118

[51] Int. Cl.$^4$ ............................................. F16G 1/24
[52] U.S. Cl. ..................................... 474/245; 474/201
[58] Field of Search ............... 474/201, 242, 244, 245

[56] References Cited

U.S. PATENT DOCUMENTS 4,569,671  2/1986  Ledvina ..................... 474/245 X

FOREIGN PATENT DOCUMENTS

| 39-3919 | 2/1964 | Japan . |
| 40-13929 | 5/1965 | Japan . |
| 61-17744 | 1/1986 | Japan . |
| 61-24853 | 2/1986 | Japan . |
| 61-85745 | 6/1986 | Japan . |

*Primary Examiner*—Thuy M. Bui
*Attorney, Agent, or Firm*—Parkhurst & Oliff

[57] ABSTRACT

A chain belt comprises a plurality of V-shape blocks and connecting means. The V-shape block includes a pair of lateral side surfaces, a first contacting surface and a second contacting surface. An opening is defined within the first and second contacting surfaces of the V-shape block. The connecting means connects the plurality of V-shape blocks to each other, and forms a continuous loop. The connecting means includes a plurality of links and a plurality of pins. The link is inserted in the opening of the V-shape block. The link includes a pair of ends and an intermediate portion. The intermediate portion of the link is positioned in the opening of the V-shape block. The ends of the link are located on opposite sides of the V-shape block. An aperture is defined within each of the ends of the link. An outer projection extends outwardly from at least one of the ends of the link toward the outside of the continuous loop. The outer projection of the link includes a first contacting edge and a second contacting edge. The first contacting edge of the outer projection of the link is in contact with the first contacting surface of the V-shape block and the second contacting edge of the outer projection of the link is selectively in contact with the second contacting surface of an adjacent V-shape block. The pin is inserted into the apertures of the links.

5 Claims, 18 Drawing Sheets

CHAIN BELT

BACKGROUND OF THE INVENTION

The present invention relates to a chain belt, which spans between an input pulley and an output pulley, for transmitting torque from the input pulley to the output pulley.

More particularly, the present invention relates to improvements in the chain belt, which includes a plurality of links, a plurality of pins and a plurality of V-shape blocks. The chain belt spans between an input pulley and an output pulley of a continuously variable transmission mounted on a vehicle.

A chain belt is disclosed in Japanese Utility Model publication No. 3919/64. The Japanese publication No. 3919/64 discloses a chain belt which includes a plurality of links, a plurality of pins and a plurality of V-shape blocks. The chain belt spans between an input pulley and an output pulley and each of the input and output pulleys includes a V-shape groove thereon. The plurality of V-shape blocks of the chain belt are located within the V-shape grooves of the input and output pulleys. The V-shape block includes an opening therewithin and the link includes a pair of recesses and a pair of apertures. One aperture is defined within each end portion of the link. The pair of recesses are defined within an intermediate portion of the link in the longitudinal direction of the link (i.e., the pair of recesses are located between the two end portions of the link), and one recess is defined on each of the outer and inner sides of the link. When the link is assembled to the V-shape block, the recesses engage with horizontal beams of the V-shape block which define upper and lower edges of the opening of the V-shape block. One of the plurality of pins is inserted into the aperture of the link and each of the plurality of links is connected to another of the plurality of links by the pin. In assembly condition, a continuous V-shape loop of the chain belt is formed by the plurality of links, the plurality of V-shape blocks and the plurality of pins.

However, as shown in FIG. 31, when this conventional continuous V-shape loop of the chain belt 910 spans between the input and output pulleys 906 and 907, the continuous V-shape loop of the chain belt 910 is bent downwardly between the input and output pulleys 906 and 907 by the weight of the chain belt 910. As a result, when the chain belt 910 rotates with the input and output pulleys 906 and 907, the chain belt 910 oscillates up and down between the input and output pulleys 906 and 907 and the chain belt 910 hits the input and output pulleys 906 and 907. The oscillation of the chain belt 910 makes noise and reduces the durability of the plurality of links 951 of the chain belt 910 and the input and output pulleys 906 and 907.

Further, as shown in FIG. 32, stress concentrates on a corner 958 of the recess 957 of the conventional link 951, so that the conventional link 951 has damage on the corner 958.

Another conventional chain belt is disclosed in Japanese Utility Model Laid open No. 85745/86. The Japanese Utility Model discloses the conventional chain belt which includes a plurality of links, a plurality of pins and a plurality of V-shape blocks. To prevent the chain belt from bending downwardly between the input and output pulleys, each of the plurality of links includes a pair of side projections. When the chain belt spans between the input and output pulleys, one of the side projections of a link is in contact with one of the side projections of an another link which is located adjacent to the first link.

However, the link does not have a wide thickness in the lateral direction of the chain belt, so that when the link does not align with the other link in the longitudinal direction of the chain belt, the side projections of the links cannot be in contact with each other.

As a result, the side projections of the links cannot prevent the chain belt from bending downwardly, and when the chain belt is rotated with the input and output pulleys, the chain belt oscillates up and down between the input and output pulleys. Accordingly, the chain belt makes noise and the durability of the chain belt and the input and output pulleys is reduced.

Further, a conventional chain belt is disclosed in Japanese Patent Laid Open No. 24853/86. The Japanese Patent discloses the conventional chain belt which includes a plurality of first links, a plurality of second links, a plurality of pins and, a plurality of V-shape blocks.

The shape of the first link is different from the shape of the second link. The first link includes a pair of side projections and the second link includes a center lateral projection. When the chain belt spans between the input and output pulleys, the side projection of the first link is in contact with the center lateral projection of the second link, such that a combination of the first and second links prevents the chain belt from bending downwardly between the input and output pulleys.

However, in a manufacturing step, the first and second links must be produced separately and the manufacturing cost of the chain belt increases.

Further, in an assembling step, the first link must be assembled between a pair of the second links and the assembly time and cost of the chain belt increase.

SUMMARY OF THE INVENTION

The present invention ws developed in view of the foregoing background and to overcome the foregoing drawbacks. It is accordingly an object of this invention to provide a chain belt which can prevent itself from bending downwardly more than a predetermined amount.

To prevent the chain belt from bending downwardly more than the predetermined amount, the chain belt includes a plurality of V-shape blocks and connecting means. The V-shape block includes a pair of lateral side surfaces, a first contacting surface and a second contacting surface. The first and second contacting surfaces are defined between the pair of lateral side surfaces. The first contacting surface is located on a side opposite the second contacting surface. An opening is defined within the first and second contacting surfaces of the V-shape block. Another V-shape block is located adjacent to the V-shape block. The first contacting surface of one V-shape block faces to the second contacting surface of another V-shape block. The connecting means connects the plurality of V-shape blocks to each other, and forms a continuous loop. The connecting means includes a plurality of links and a plurality of pins. The link is inserted in the opening of the V-shape block. The link includes a pair of ends and an intermediate portion. The intermediate portion of the link is mounted on the V-shape block. The ends of the link are located on opposite sides of the V-shape block. An aperture is defined within each of the ends of the link. An outer projection extends outwardly from at least one of the pair of ends of the link toward the outside of the continuous loop and the outer projection of the link includes a first contacting edge and a second contacting edge. The first contacting edge and the second contacting edge are located on opposite sides of the outer projection of the link. The first contacting edge of the outer projection of the link is in contact with the first contacting surface of the V-shape block and the second contacting edge of the outer projection of the link is selectively in contact with the second contacting surface of another V-shape block. An aperture, defined within an end of another link, is located adjacent to the aperture defined within the end of the link.

The pin is inserted into the apertures of the links.

Accordingly, when the plurality of links of the connecting means are connected to each other by the plurality of pins and when the chain belt spans between the input and output pulleys, the first and second contacting edges of the outer projections of the links are in contact with the first and second contacting surfaces of the plurality of V-shape blocks. As a result, the continuous loop of the chain belt does not bend downwardly more than a predetermined amount.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENTS

The present invention will be described in detail with reference to the accompanying drawings which illustrate different embodiments according to the present invention.

Figure 1:
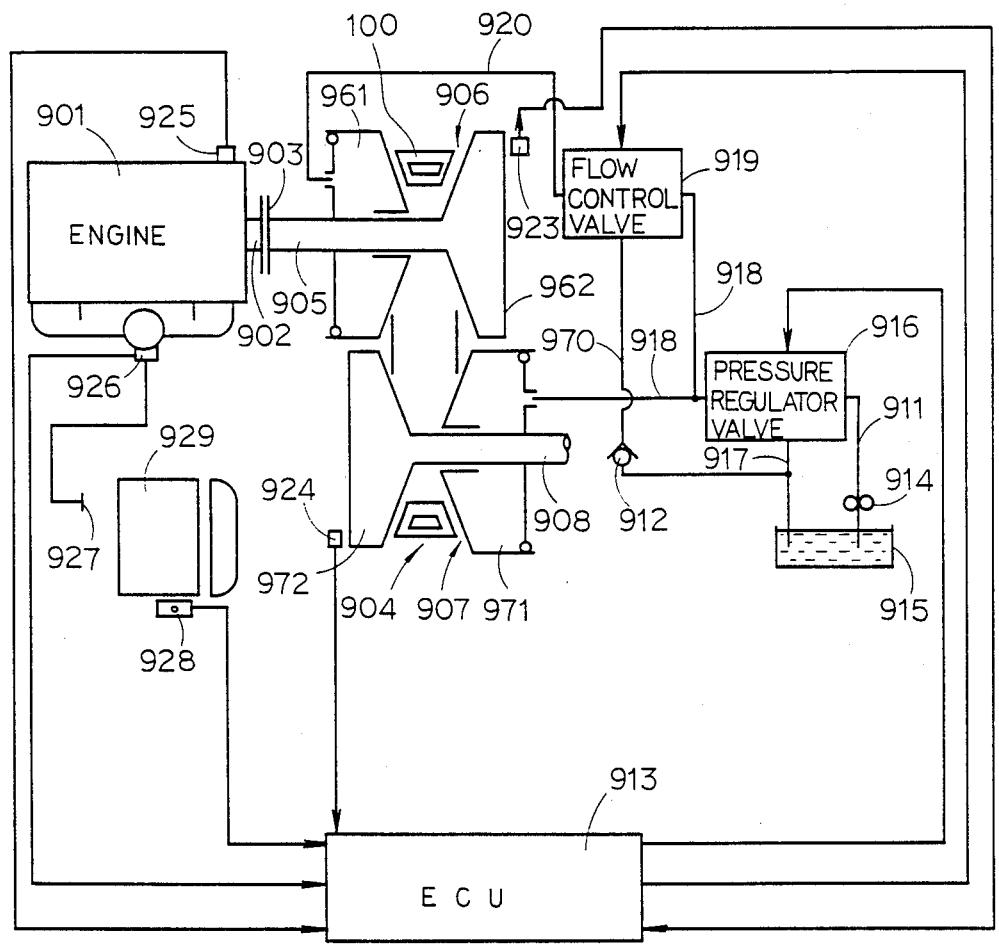
FIG. 1 is a schematic view of a continuously variable transmission.
Figure 2:
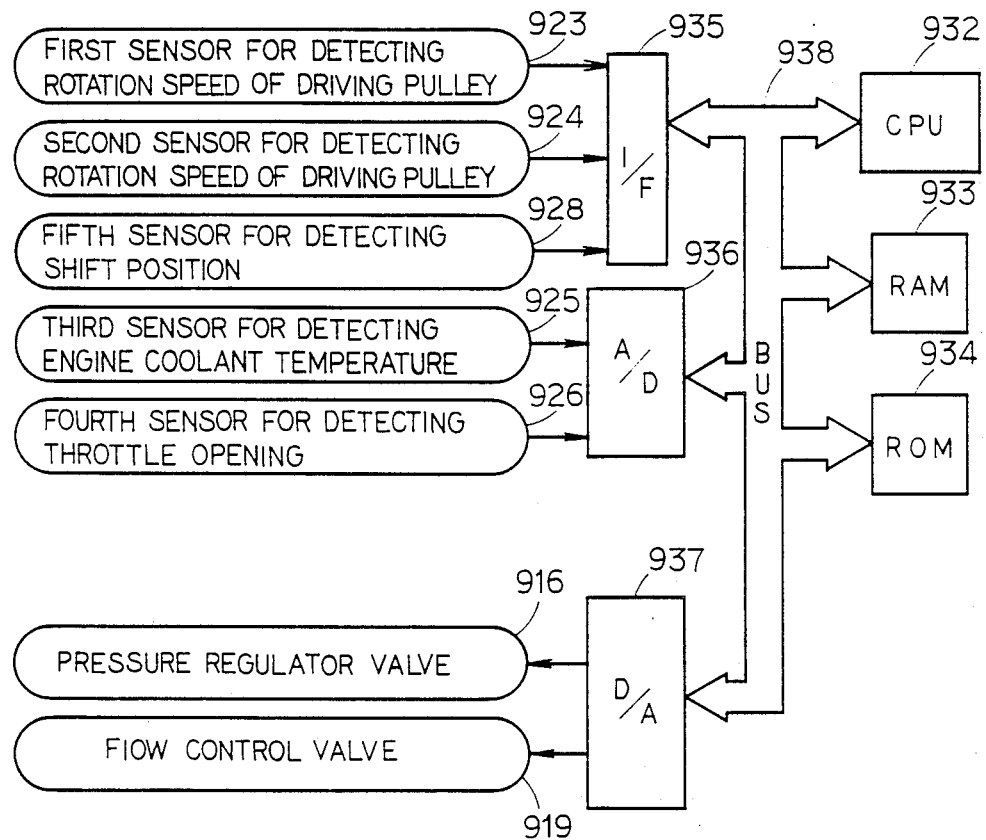
FIG. 2 is a circuit diagram of an electronic control unit.

Referring to FIG. 1, an engine 901 includes an output shaft 902 which is connected to an input shaft 905 of a continuously variable transmission 904 (hereinafter, "CVT" represents the continuously variable transmission) through a clutch 903. Accordingly, the input shaft 905 of the CVT 904 is driven by the engine 901.

Figure 3:
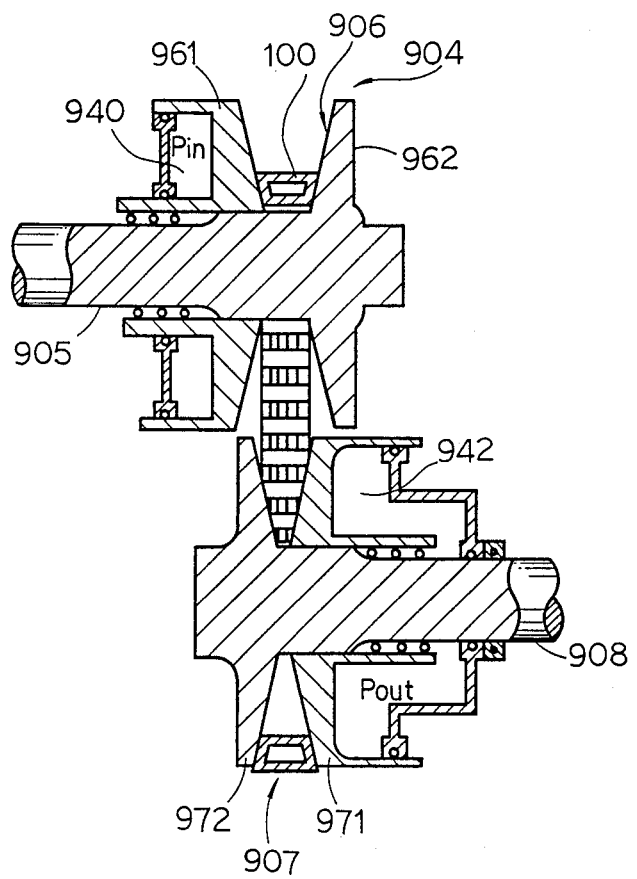
FIG. 3 is an enlarged cross-sectional view of the continuously variable transmission.

The CVT 904 includes an input pulley 906 and an output pulley 907. The input pulley 906 is connected to the input shaft 905. The input pulley 906 includes a first movable member 961 and a first non-movable member 962. A V-shape groove is defined between the first movable and non-movable members 961 and 962. The first movable member 961 is axially displaceable on and rotates with the input shaft 905. As shown in FIG. 3, a first hydraulic cylinder 940 is defined within the first movable member 961 and the pressure "$P_{in}$" is exerted in the first hydraulic cylinder 940. The first movable member 961 is axially displaced by the pressure "$P_{in}$" in the first hydraulic cylinder 940. Oil is supplied to the first hydraulic cylinder 940 and the amount of the oil is controlled by a flow control valve 919. The flow control valve 919 is connected to the first hydraulic cylinder 940 through a first oil passage 920.

Accordingly, when the amount of the oil applied to the first hydraulic cylinder 940 is increased, the first movable member 961 is axially displaced in a direction toward the first non-movable member 962. As a result, a space, defined between the first movable and non-movable members 961 and 962, is decreased and an effective diameter of the input pulley 906 is increased. On the other hand, the output pulley 907 is connected to an output shaft 908. The output pulley 907 includes a second movable member 971 and a second non-movable member 972. A V-shape groove is defined between the second movable and non-movable members 971 and 972. The second movable member 971 is axially displaceable on and rotates with the output shaft 908. As shown in FIG. 3, a second hydraulic cylinder 942 is defined within the second movable member 971 and the pressure "$P_{out}$" is exerted in the second hydraulic cylinder 942. The second movable member 971 is axially displaced by the pressure "$P_{out}$" in the second hydraulic cylinder 942. The second hydraulic cylinder 942 is connected to a pressure regulator valve 916 through a second oil passage 918. The pressure "$P_{out}$" in the second hydraulic cylinder 942 is controlled by the pressure regulator valve 916.

Accordingly, when the amount of the oil in the second hydraulic cylinder 942 is increased, the second movable member 971 is axially displaced in a direction toward the second non-movable member 972. As a result, a space, defined between the second movable and non-movable members 971 and 972, is decreased and an effective diameter of the output pulley 907 is increased.

Further, the second oil passage 918 diverges and the flow control valve 919 communicates with the pressure regulator valve 916 through the second oil passage 918.

The pressure regulator valve 916 communicates with a reservoir 915 through a third oil passage 911. A hydraulic fluid pump 914 is connected to the third oil passage 911 and the hydraulic fluid pump 914 pumps hydraulic fluid from the reservoir 915 to the pressure regulator valve 916. The hydraulic fluid pump 914 is driven by a motor and consumes engine power.

The pressure regulator valve 916 controls the pressure of the fluid applied to the second oil passage 918. The flow control valve 919 is a three port connection valve, and includes an inlet port in communication with the second oil passage 918, a drain port in communication with a drain passage 970 and an outlet port in communication with the first oil passage 920. When the flow control valve 919 is in a first position, the inlet port communicates with the outlet port. When the flow control valve 919 is in a second position, the inlet port does not communicate with the outlet port, and there is no communication among the three ports. When the flow control valve 919 is in a third position, the outlet port communicates with the drain port. A check valve 912 is provided on the drain passage 970. The check valve 912 only allows hydraulic fluid to flow in a single direction, from the flow control valve 919 to the hydraulic fluid reservoir 915. The pressure regulator valve 916 communicates with the hydraulic fluid reservoir 915 through a second drain passage 917.

A chain belt 100 extends between the input and output pulleys 906 and 907. Accordingly, the torque of the input pulley 906 is transmitted to the output pulley 907 through the chain belt 100. Further, the torque of the output shaft 908 is outputted to wheels (not shown in drawings).

The hydraulic pressure "$P_{in}$" of the first hydraulic cylinder 940 is varied to adjust a RPM ratio "e". The RPM ratio "e" is calculated by a first formula as follows:

$$\text{RPM ratio ``}e\text{''} = RPM_{out}/RPM_{in} \qquad (1),$$

wherein $RPM_{out}$ represents a rotational speed of the driven pulley 907 and $RPM_{in}$ represents a rotational speed of the driving pulley 906.

Accordingly, when the amount of the oil applied to the first hydraulic cylinder 940 is increased the RPM ratio "e" is increased. Conversely, when the amount of the oil applied to the first hydraulic cylinder 940 is decreased, the RPM ratio "e" is decreased.

To minimize the amount of engine power consumed by the hydraulic fluid pump 914, the hydraulic pressure "$P_{out}$" in the second hydraulic cylinder 942 is controlled to be as low as possible.

Further, the hydraulic pressure "$P_{in}$" per an area in the first hydraulic cylinder 940 is designed to be less than the hydraulic pressure "$P_{out}$" per an area in the second hydraulic cylinder 942. However, the total pressure applied to the second movable member 971 of the output pulley 907 is less than a total pressure applied to the first movable member 961 of the input pulley 906 because the first hydraulic cylinder 940 has a larger area than that of the second hydraulic cylinder 942.

Hence, it is possible to obtain the RPM ratio "e" of greater than or at least equal to one.

The RPM ratio "e" is controlled by an electronic control unit (hereinafter ECU represents the electronic control unit) 913. The ECU 913 receives output signals from first through fifth sensors 923 through 926 and 928.

The first sensor 923 detects the rotational speed $RPM_{in}$ of the input pulley 906. The second sensor 924 detects the rotational speed $RPM_{out}$ of the output pulley 907. The third sensor 925 is mounted adjacent a cylinder block of the engine 901 and detects the temperature of the engine coolant. The fourth sensor 926 detects an amount of a throttle opening of a throttle valve, which is varied in proportion to a stroke of an accelerator pedal 927. The fifth sensor 928 is mounted near a passenger seat 929 and detects the position of a shift lever of the transmission. The ECU 913 outputs a control signal to the pressure regulator valve 916 and the flow control valve 919.

As a result, the ECU 913 controls the pressure regulator valve 916 and the flow control valve 919 in accordance with the output signals detected by the first through fifth sensors 923 through 926 and 928. The ECU 913 includes a central processing unit (hereinafter CPU represents the central processing unit) 932 which carries out arithmetic and logic processing functions, an inter-face (hereinafter I/F represents the inter-face) 935, an analog-digital converter (hereinafter A/D represents the analog-digital converter) 936, a random-access memory (hereinafter RAM represents the random-access memory) 933 which temporarily stores the calculated data of the CPU 932, a read-only memory (hereinafter ROM represents the read-only memory) 934 which stores a predetermined control program and arithmetic constants therein, and a digital-analog converter (hereinafter D/A represents the digital-analog converter) 937. They are connected by a common bus 938. The I/F 935 receives the output signal from the first sensor 923 corresponding to the rotational speed of the input pulley 906 "$RPM_{in}$", the output signal from the second sensor 924 corresponding to the rotational speed of the output pulley 907 "$RPM_{out}$" and the output signal from the fifth sensor 928. The A/D 936 receives the output signals from the third sensor 925 and the fourth sensor 926. The CPU 932 compares the output signals with stored informations, and outputs output signals to the D/A 937. The ROM 934 works in conjunction with the CPU 932. The ROM 934 stores a data map, which includes the RPM ratios "e", and the desired engine speed. The CPU 932 compares the actual operating conditions with the data stored in the ROM 934, and outputs an output signal which controls the regulator valve 916 and the flow control valve 919.

Figure 4:
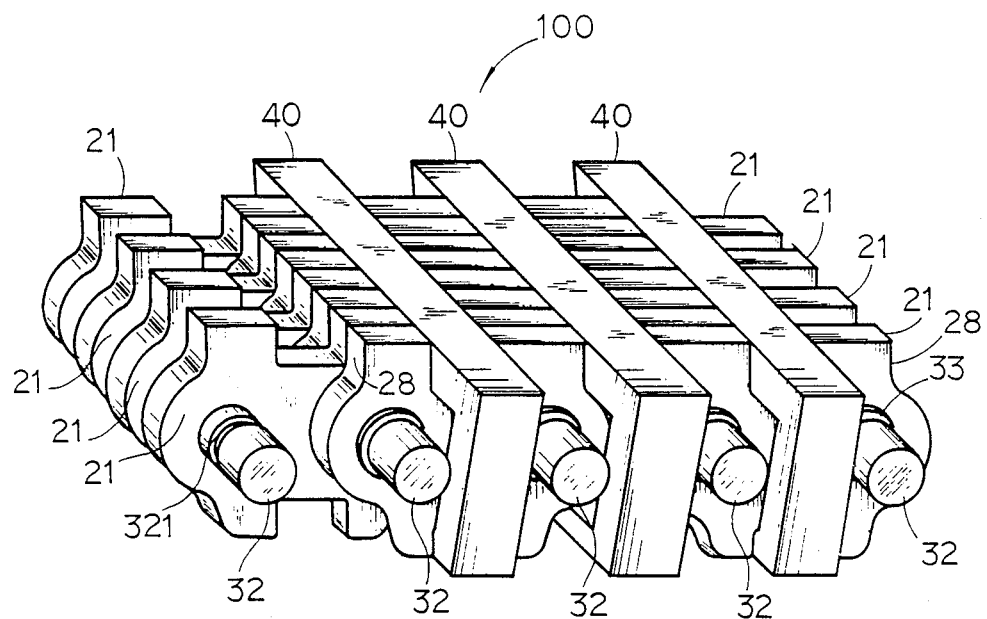
FIG. 4 is an enlarged perspective view of a chain belt according to the present invention.
Figure 5:
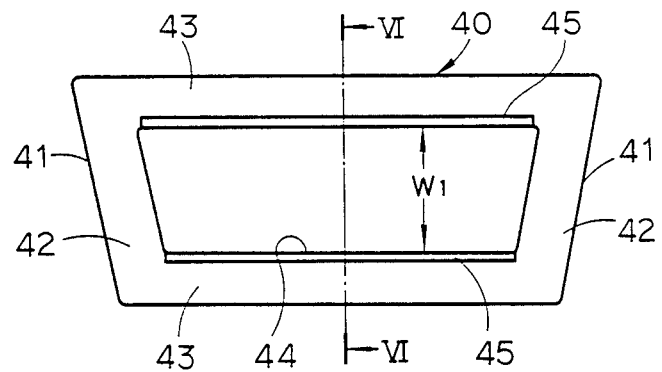
FIG. 5 is an enlarged plan view of a V-shape block of the chain belt.
Figure 6:
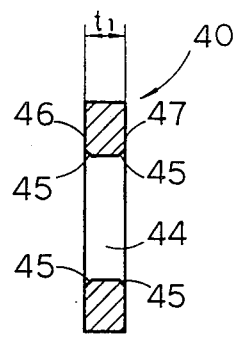
FIG. 6 is an enlarged cross-sectional view of the V-shape block of the chain belt.

As shown in FIG. 4, the chain belt 100 includes a plurality of V-shape blocks 40, a plurality of first links 21 and a plurality of pins 32. In an assembled condition, the plurality of first links 21 and the plurality of pins 32 function as a connecting means. As shown in FIGS. 5 and 6, the V-shape block 40 includes a pair of lateral side surfaces 41, a first contacting surface 46 and a second contacting surface 47. The lateral side surfaces 41 are inclined to each other and form a V-shape. When the V-shape block 40 is mounted on the input or output pulley 906 or 907, the lateral side surfaces 41 of the V-shape block 40 are in contact with the movable and non-movable members 961, 962, 971 and 972 of the input or output pulleys 906 and 907.

The V-shape block 40 includes a pair of horizontal beams 43 and a pair of inclined poles 42. The inclined pole 42 includes the lateral side surface 41. An opening 44 is defined within the pair of horizontal beams 43 and the pair of inclined poles 42. One of the horizontal beams 43 is located apart from the other horizontal beam 43 by a first vertical distance "$W_1$". The horizontal beams 43 include chamfers 45 along the opening 44. The first contacting surface 46 is parallel to the second contacting surface 47. The opening 44 penetrates the first and second contacting surfaces 46 and 47 of the V-shape block 40. The V-shape block 40 has a thickness "$t_1$" between the first and second contacting surface 46 and 47.

Figure 7:
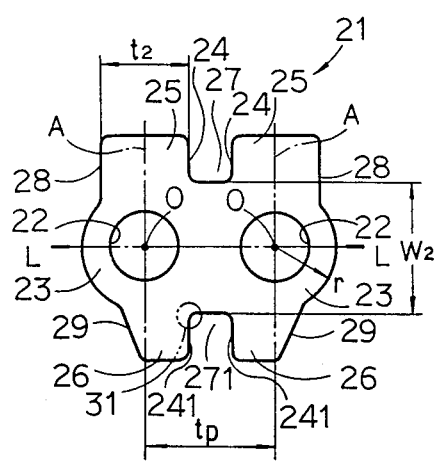
FIG. 7 is an enlarged plan view of a link of the chain belt.
Figure 8:
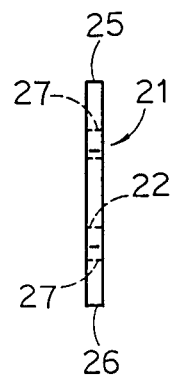
FIG. 8 is an enlarged side view of the link of the chain belt.

As shown in FIGS. 7 and 8, the first link 21 includes a pair of end portions 23, a pair of outer projections 25 and a pair of inner projections 26. An aperture 22 is defined within each of the end portions 23 of the first link 21. A first recess 27 is defined between the pair of outer projections 25, and a second recess 271 is defined between the pair of inner projections 26. Longitudinal distances between the pair of outer projections 25 and between the pair of inner projections 26 are substantially the same as the thickness "$t_1$" of the V-shape block 40. The outer projection 25 includes a first inner contacting edge 24 and an outer contacting edge 28. The inner projection 26 includes a second inner contacting edge 241 and a first inclined contacting edge 29. The first inner contacting edge 24 is aligned with the second inner contacting edge 241. The first and second inner contacting edges 24 and 241 are perpendicular to a longitudinal line L—L of the link 21. The longitudinal line L—L connects a pair of centers "O" of the apertures 22. Vertical lines "A", are perpendicular to the longitudinal line L—L and pass through the center "O" of the aperture 22. Each of the vertical lines "A" is located on the outer and inner projections 24 and 26. One center "O" of the apertures 22 is apart from another center "O" of the apertures 22 by a first distance "$t_p$".

Figure 32:
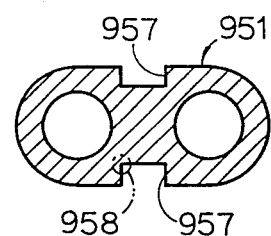
FIG. 32 is an enlarged plan view of a conventional link of the conventional chain belt.

As a result of a shape of the first link 21 mentioned above, the first link 21 has higher durability than a conventional link 951 shown in FIG. 32.

Further, each of the first and second recesses 27 and 271 includes a pair of rounded bottom corners 31. Accordingly, even if stress concentrates on the rounded bottom corner 31 of the first or second recess 27 or 271, the first link 21 is stronger against damage than the conventional link 951.

The outer contacting edge 28 is parallel to and apart from the first inner contacting edge 24 by a second distance "$t_2$". The second distance "$t_2$" is determined by a second formula as follows:

$$t_2 \leq t_p - t_1 \tag{2}$$

wherein "$t_p$" is the distance between the centers "O" of the apertures 22 of the link 21, and "$t_1$" is the thickness between the first and second contacting surfaces 46 and 47 of the V-shape block 40. The first inclined contacting edge 29 is inclined to the second inner contacting edge 241 by an angle of 15 degrees.

A second vertical distance "$W_2$" is defined between bottoms of the first and second recesses 27 and 271. The second vertical distance "$W_2$" is determined by a third formula as follows:

$$W_2 \geq 2r \tag{3}$$

wherein "r" is a half diameter defined between the center "O" of the aperture 22 and a peripheral edge of the end portion 23 of the link 21. The second vertical distance "$W_2$" is substantially the same as the first vertical distance "$W_1$" of the V-shape block 40. The link 21 is produced by a stamping machine, so that it is easy to produce the link 21.

Figure 9:
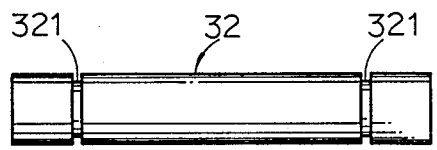
FIG. 9 is an enlarged plan view of a pin of the chain belt.

As shown in FIG. 9, a pin 32 includes peripheral grooves 321 on both ends thereof. The pin 32 has a length shorter than a lateral distance defined between the lateral surfaces 41 of the V-shape block 40.

The chain belt 100 is assembled in accordance with assembling steps described hereinafter.

First of all, the link 21 is inclined and inserted into the opening 44 of the V-shaped block 40. When the link 21 is righted, the first and second recesses 27 and 271 of the link 21 engage with the horizontal beams 43 of the V-shape block 40. In this condition, the first and second inner contacting edges 24 and 241 of the link 21 are in contact with the first and second contacting surfaces 46 and 47 of the V-shape block 40. When the plurality of links 21 are inserted, a space is defined between the links 21. As a result, a plurality of assembled V-shape blocks 40, engaged with a plurality of links 21 are produced.

Secondly, each of the end portions 23 of the links 21 of one of the assembled V-shape blocks 40 is inserted into the space defined between the links 21 of the another assembled V-shape blocks 40.

Accordingly, at least a side surface of the links 21 of the assembled V-shape block 40 is in contact with a side surface of the links 21 of another assembled V-shape block 40. The apertures 22 of the links 21 of the assembled V-shape block 40 coincide with the apertures 22 of the links 21 of another assembled V-shape block 40.

Thirdly, the pin 32 is inserted into the apertures 22 of the links 21 of the assembled V-shape blocks 40. The both ends of the pin 32 projects from the plurality of links 21. A pair of E-rings 33 are engaged with the peripheral grooves 321 of the pin 32, resulting that the assembled V-shape blocks 40 are connected each other by the pin 32. The pair of E-rings 33 prevent the pin 32 from dropping out from the apertures 22 of the links 21 of the V-shape blocks 40.

In a similar manner, the plurality of the assembled V-shape blocks 40 are connected to each other by connecting means including the plurality of pins 32 and the plurality of links 21. As a result, the chain belt 100 is assembled.

Figure 10:
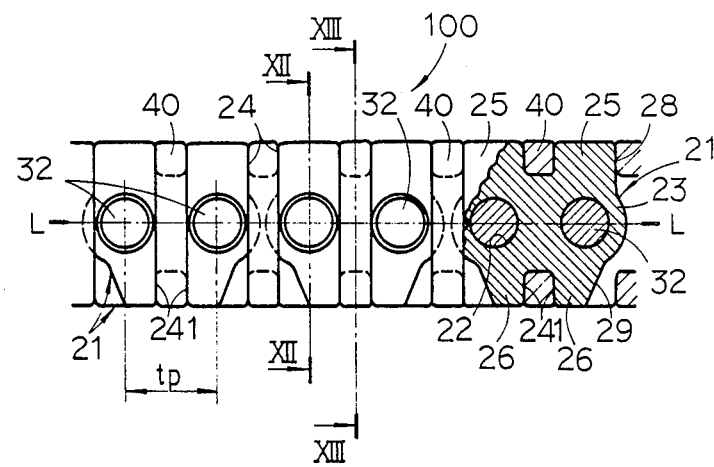
FIG. 10 is an enlarged plan view of the chain belt, wherein a partially cross-sectional view of the chain belt is shown.
Figure 11:
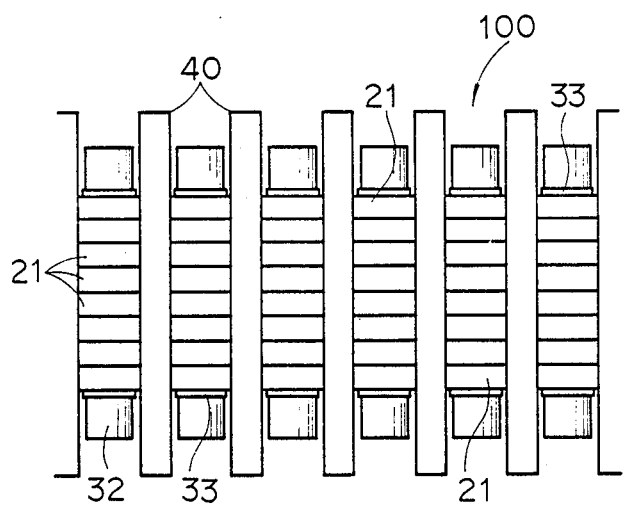
FIG. 11 is an enlarged top view of the chain belt.

In an assembled condition, as shown in FIGS. 10 and 11, when the chain belt 100 spans between the input and output pulleys 906 and 907, the outer contacting edges 28 of the outer projections 25 of the link 21 are in contact with the first or second contacting surface 46 or 47 of the another V-shape block 40. Accordingly, the chain belt 100 does not bend downwardly between the input and output pulleys 906 and 907.

However, the inclined contacting edges 29 of the inner projections 26 are not in contact with the first or second contacting surface 46 or 47 of another V-shape block 40.

Accordingly, the chain belt 100 can bend upwardly, such that when the V-shape blocks 40 of the chain belt 100 are positioned about the input and outut pulleys 906 and 907 of the CVT 904, the plurality of V-shape blocks 40 are in contact with the movable and non-movable member 961, 962, 971 and 972 of the input or output pulley 906 and 907.

Further, as shown in FIGS. 10 and 11, the pin 32 is not in contact with the first or second contacting surfaces 46 or 47 of the V-shape block 40.

Figure 12:
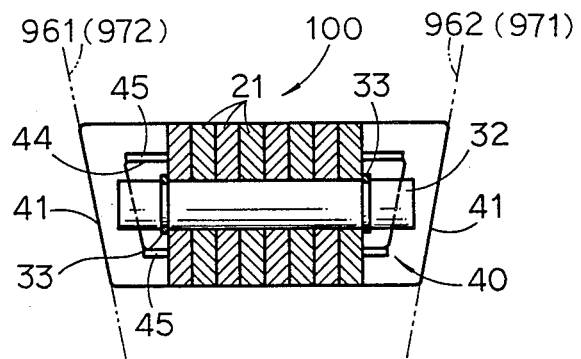
FIG. 12 is an enlarged cross-sectional view of the chain belt taken along the line XII—XII in FIG. 10.
Figure 13:
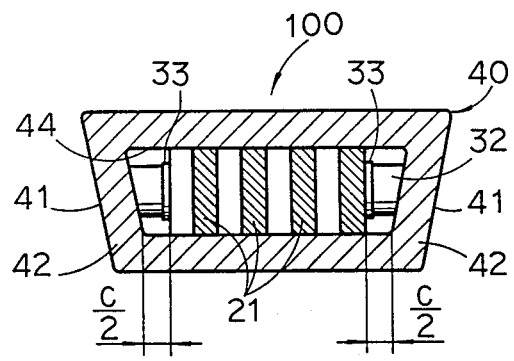
FIG. 13 is an enlarged cross-sectional view of the chain belt taken along the line XIII—XIII in FIG. 10.

As shown in FIGS. 12 and 13, the plurality of assembled links 21 are slidable in the lateral direction of the V-shape block 40 because the lateral distance of the opening 44 of the V-shape block 40 is greater than the total thickness of the plurality of links 21 by a distance "C" (i.e., a pair of half distances "C/2" are defined respectively between the inclined poles 42 of the V-shape block 40 and both sides of the plurality of links 21).

Figure 14:
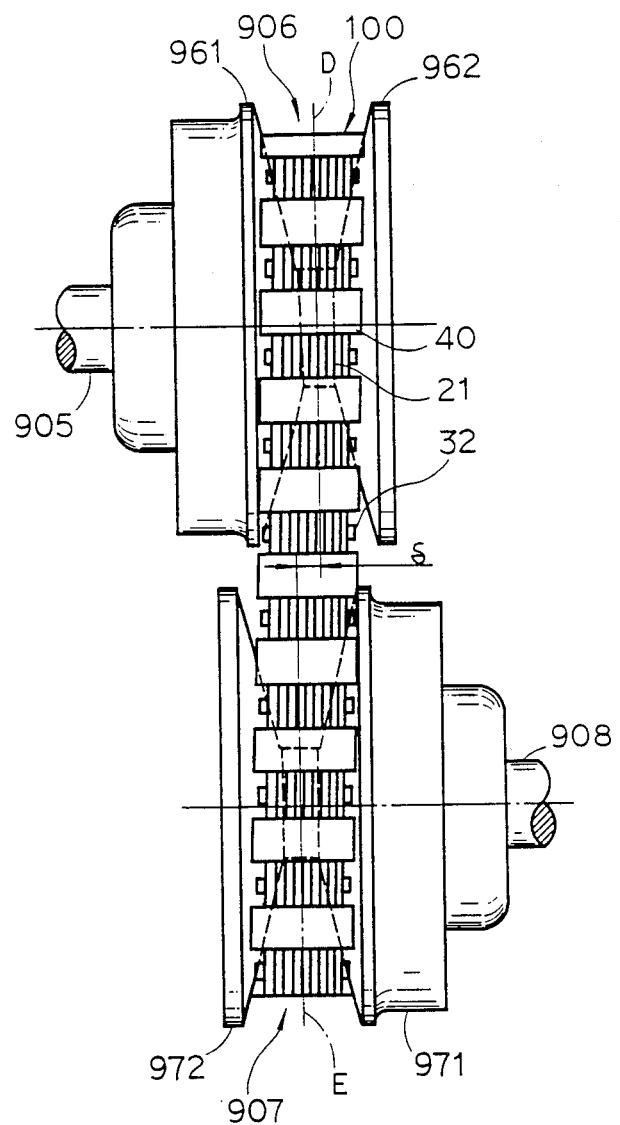
FIG. 14 is an enlarged plan view of the continuously variable transmission, wherein a center line of an input pulley is apart from a center line of an output pulley.
Figure 15:
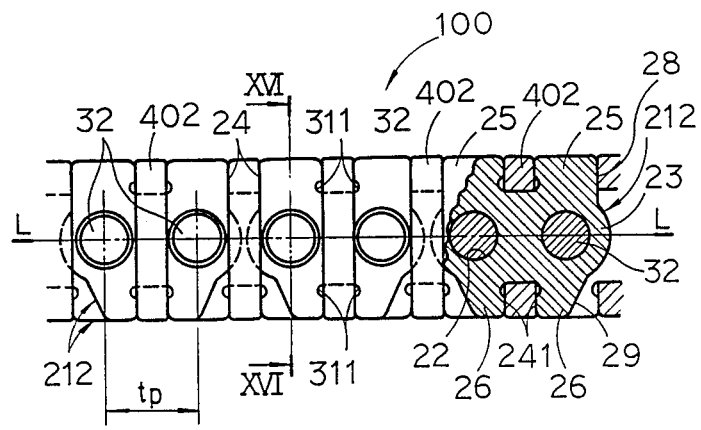
FIG. 15 is an enlarged plan side view of the chain belt of a second embodiment according to the present invention, wherein a partially cross-sectional view of the chain belt is shown.
Figure 16:
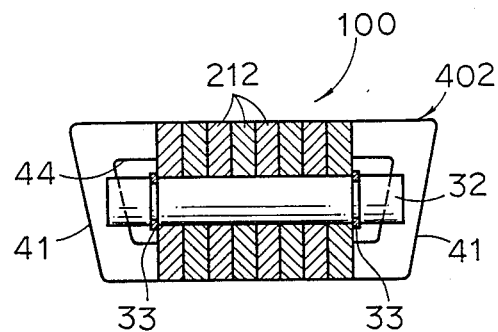
FIG. 16 is an enlarged cross-sectional view of the chain belt of the second embodiment takes along the line XVI—XVI in FIG. 15.

Accordingly, as shown in FIG. 14, even when a center line "D" between the movable and non-movable members 961 and 962 of the input pulley 906 is apart from a center line "E" between the movable and non-movable members 971 and 972 of the output pulley 907 by a distance "δ", the plurality of links can slide on the V-shape block 40, resulting that the chain belt 100 can transmit torque from the input pulley 906 to the output pulley 907. The distance " " is determined by a fourth formula as follows:

$$\delta < c \qquad (4),$$

wherein the distance "C" is a difference between the lateral distance of the opening 44 of the V-shape block 40 and the total thickness of the plurality of links 21.

When the input pulley 906 rotates about the input shaft 905, the torque is transmitted in turn from the input pulley 906 to the V-shape blocks 40, from the V-shape blocks 40 to the links 21, from the links 21 to the pins 32, from the pins 32 to the links 21, from the links 21 to other V-shape blocks 40, finally to the output pulley 907 of the CVT 904.

FIGS. 15 through 19 show a second embodiment of the chain belt 100. The second embodiment is substantially similar to the first embodiment disclosed in FIGS. 4 through 13. However, a second link 212 includes notches 311. The notches 311 are located at bottom corners of the first and second recesses 27 and 271. The notches 311 extend in the longitudinal direction L—L of the second link 212. Openings of the notches 311 of the first recess 27 face each other and openings of the notches 311 of the second recess 271 also face to each other.

A second V-shape block 402 does not have the chamfers on the horizontal beams 43 thereof.

Accordingly, in the assembled condition, the bottom corners of the first and second recesses 27 and 271 of the second link 212 are not in contact with the horizontal beams 43 of the second V-shape block 402.

Figure 20:
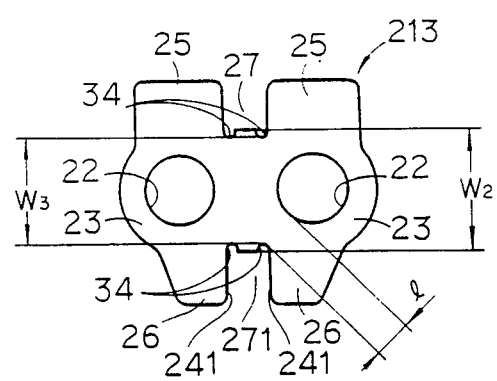
FIG. 20 is an enlarged plan view of a prototype link.

FIG. 20 shows a prototype link 213 of the chain belt 100. The prototype 213 includes second notches 34. The second notches 34 are located at the bottom corners of the first and second recesses 27 and 271. The notches 34 extend in the vertical direction of the prototype link 213. Accordingly, a third vertical distance "$W_3$", defined between bottoms of the second notches 34 of the first and second recesses 27 and 271, is less than the second vertical distance "$W_2$" defined between the bottoms of the first and second recesses 27 and 271 of the second link 212. Further, a distance "l", defined between the bottom of the second notch 34 and the aperture 22 is less than a distance defined between the bottom of the first or second recess 27 or 271 and the aperture 22 of the second link 212.

Therefore, when stress is concentrated on the second notches 34 of the prototype link 213, the prototype link 213 has a damage.

Figure 17:
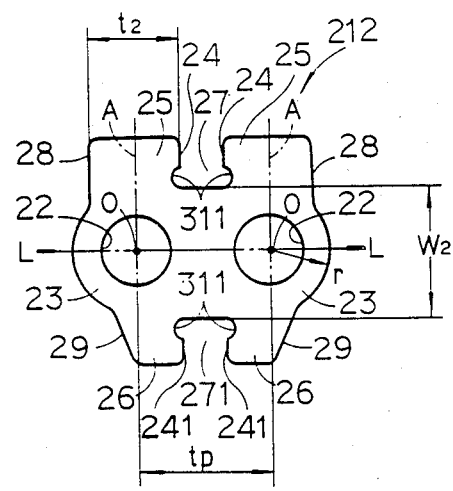
FIG. 17 is an enlarged plan view of a link of the second embodiment.
Figure 18:
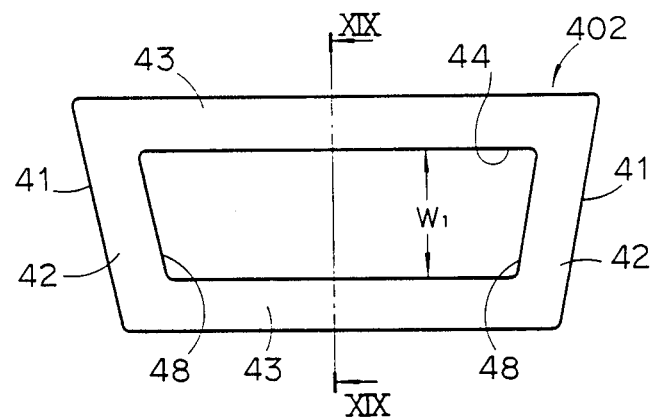
FIG. 18 is an enlarged plan view of a V-shape block of the second embodiment.
Figure 19:
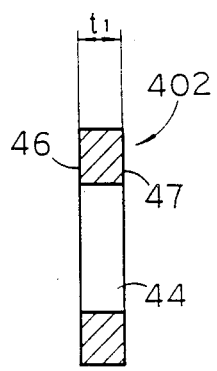
FIG. 19 is an enlarged cross-sectional view of the V-shape block of the second embodiment.

However, as shown in FIG. 17, the second link 212 has the second vertical distance "$W_2$" defined between bottoms of the first and second recesses 27 and 271. A distance defined between the bottom of the first or second recess 27 or 271 and the aperture 22 of the second link 212 is the same as that of the first link 21. Accordingly, even when stress is concentrated on the notches 311 of the second link 212, the second link 212 does not have damage.

Figure 21:
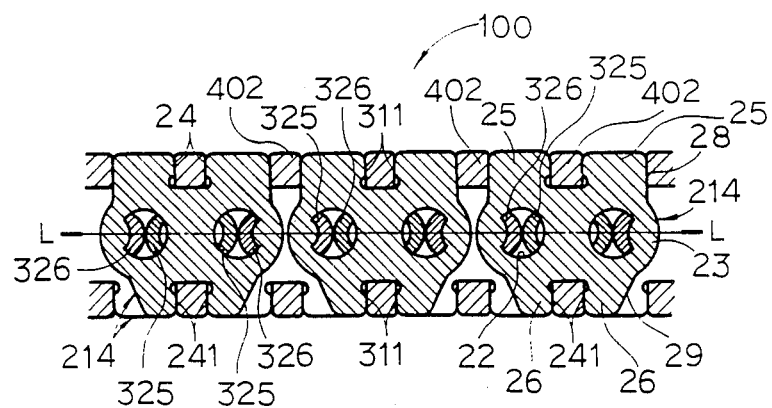
FIG. 21 is an enlarged cross-sectional view of the chain belt of a third embodiment according to the present invention.
Figure 22:
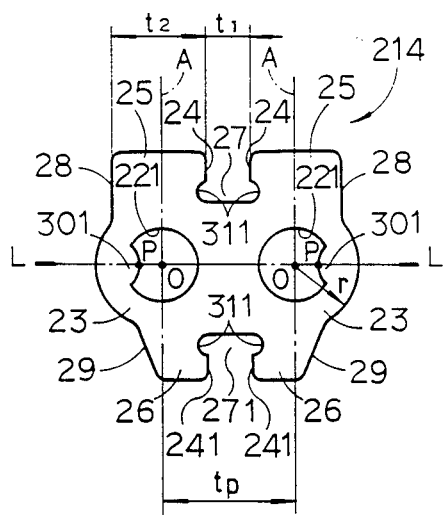
FIG. 22 is an enlarged plan view of a link of the third embodiment.
Figure 23:
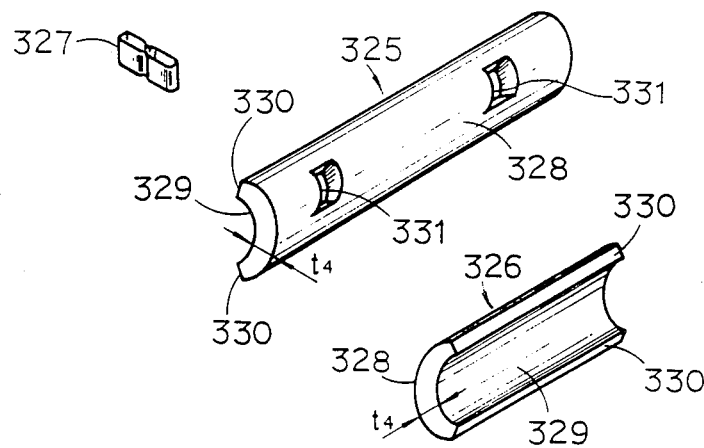
FIG. 23 is an enlarged perspective disassembled view of first and second locker pins and a fastener of the third embodiment.
Figure 24:
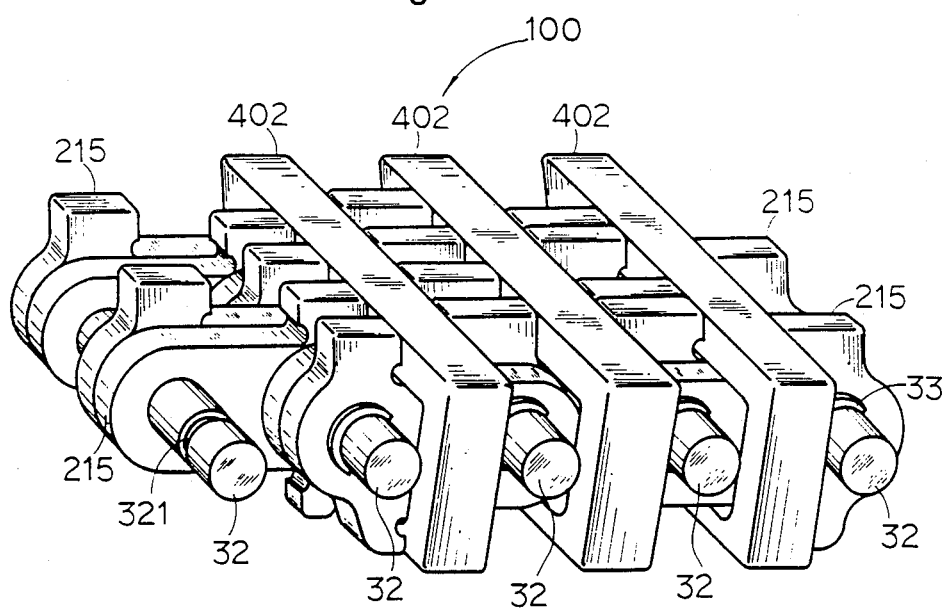
FIG. 24 is an enlarged perspective view of the chain belt of a fourth embodiment according to the present invention.
Figure 25:
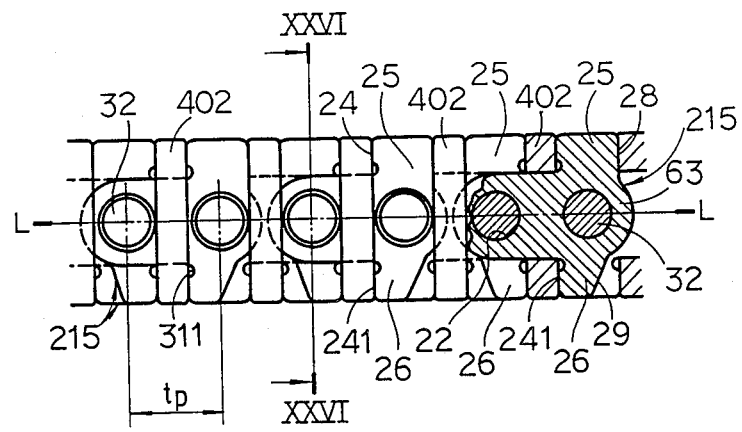
FIG. 25 is an enlarged plan view of the chain belt of the fourth embodiment, wherein a partially cross-sectional view of the chain belt is shown.
Figure 26:
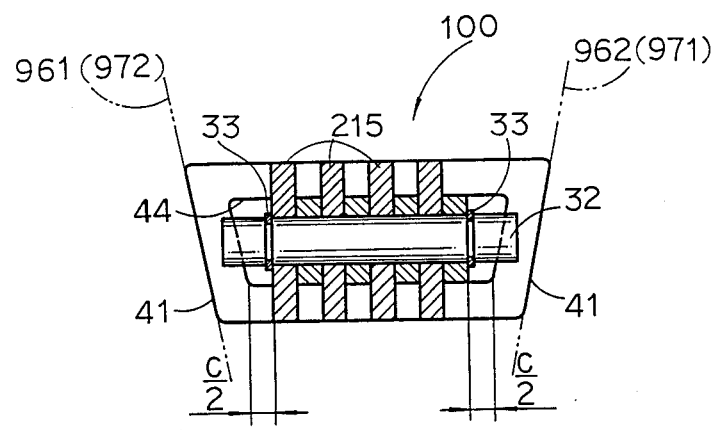
FIG. 26 is an enlarged cross-sectional view of the chain belt of the fourth embodiment taken along the line XXVI—XXVI in FIG. 25.
Figure 27:
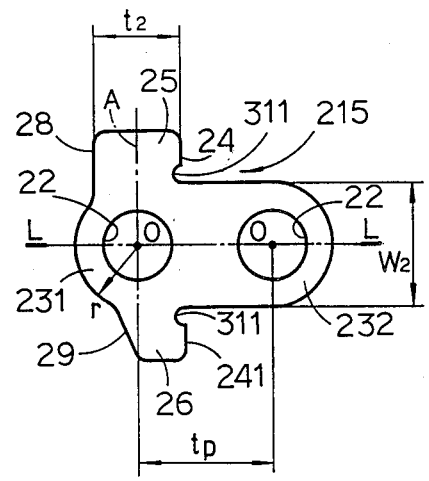
FIG. 27 is an enlarged plan view of the link of the fourth embodiment.
Figure 28:
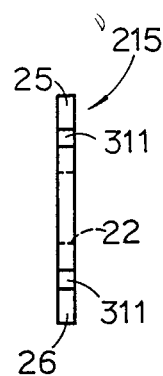
FIG. 28 is an enlarged side view of the link of the fourth embodiment.

FIGS. 21 through 23 show a third embodiment of the chain belt 100. The third embodiment is substantially similar to the second embodiment disclosed in FIGS. 15 through 19. However, a third link 214 includes projections 301 respectively located within apertures 221. The projection 301 projects from the end portion 23 of the third link 214 toward the center "O" of the aperture 221. The projection 301 has a round-shape and the most projecting point "P" of the projection 301 is located on the longitudinal line L—L of the third link 214 (i.e., the most projecting points "P" and the centers "O" are located on the longitudinal line L—L of the third link 214).

A first locker pin 325 and a second locker pin 326 are inserted into the apertures 221 of the third links 214. The first and second locker pins 325 and 326 have arcuate cross-sectional shapes. As shown in FIG. 23, the first locker pin 325 includes a rounded contacting surface 328, an engagement recess 329, a pair of side edges 330 and a pair of holes 331. A hole 331 is defined within each end of the first locker pin 325. A longitudinal distance, defined between the pair of holes 331, is greater than a longitudinal length of the second locker pin 326. The longitudinal length of the second locker pin 326 is greater than the total thickness of the third links 214. In the assembled condition, the rounded contacting surface 328 of the first locker pin 325 is in contact with and slidable on a rounded contacting surface 328 of the second locker pin 326.

The second locker pin 326 includes a rounded contacting surface 328, an engagement recess 329 and a pair of side edges 330.

The engagement recess 329 of the first or second locker pin 325 or 326 engages with the rounded projection 301 of the third link 214. The rounded projection 301 of the third link 214 corresponds with the engagement recess 329 of the first or second locker pin 325 or 326. A thickness "$t_4$" of the first locker pin 325 is substantially the same as a distance defined between the center "O" of the aperture 221 and the most projecting point "P" on the rounded projection 301 of the third link 214.

A fastener 327 is inserted into the hole 331 of the first locker pin 325 and the fastener 327 projects more than the thickness "$t_4$" of the second locker pin 326 from the rounded contacting surface 328 of the first locker pin 325.

In the assembled condition, the first locker pin 325 can slide on the rounded contacting surface 328 of the second locker pin 326, so that the third links 214, engaging with one of the second V-shape blocks 402, can rotate about the center "O" of the aperture 221 of the third links 214 engaging with another second V-shape block 402.

FIGS. 24 through 28 show a fourth embodiment of the chain belt 100. The fourth embodiment is similar to the second embodiment disclosed in FIGS. 15 and 19. However, a fourth link 215 includes a first end portion 231, a second end portion 232, only one outer projection 25 and only one inner projection 26. One of the apertures 22 is defined within the first end portion 231 and between the outer projection 25 and inner projections 26. Another aperture 22 is defined within the second end portion 232. The outer projection 25 includes the first inner contacting edge 24 and the outer contacting edge 28. The inner projection 26 includes the second inner contacting edge 241 and the first inclined contacting edge 29. The first inner contacting edge 24 is aligned with the second inner contacting edge 241. The first and second inner contacting edges 24 and 241 are perpendicular to the longitudinal line L—L of the fourth link 215. the centers "O" of the apertures 22 of the fourth link 215 are located on the longitudinal line L—L.

The vertical line "A" is perpendicular to the longitudinal line L—L and passes through the center "O" of one of the apertures 22. The vertical line "A" is located within the outer and inner projections 25 and 26. The first distance "$t_p$" is defined between the centers "O" of the apertures 22 of the fourth link 215.

In assembling steps, first of all, one of the fourth link 215 is inserted into the opening 44 of the second V-shape block 402 from one direction.

In this condition, the first and second inner contacting edges 24 and 241 of the fourth link 215 are in contact with the first contacting surface 46 of the second V-shape block 402. The second end portion 232 of the fourth link 215 projects from the second contacting surface 47 of the second V-shape block 402.

Next, a second fourth link 215 is inserted into the opening 44 of the second V-shape block 402 from an opposite direction. In this condition, the first and second inner contacting edges 24 and 241 of the second fourth link 215 are in contact with the second contacting surface 47 of the second V-shape block 402. The second end portion 232 of the second fourth link 215 projects from the first contacting surface 46 of the second V-shape block 402. A side surface of the first end portion 231 of the fourth link 215 is in contact with the side surface of the second end portion 232 of the second fourth link 215. The apertures 22 of the fourth link 215 coincide with the apertures 22 of the second fourth link 215.

Accordingly, the first recess 27 is defined between the first inner contacting edges 24 of two fourth links 215. The longitudinal distance between the first inner contacting edges 24 of the two fourth links 215 is substantially the same as the thickness "$t_1$" of the second V-shape block 402.

In a similar manner, the second recess 271 is defined between the second inner contacting edges 241 of two fourth links 215, and the longitudinal distance between the second inner contacting edges 241 of the two fourth links 215 is substantially the same as the thickness "$t_1$" of the second V-shape block 402.

Figure 29:
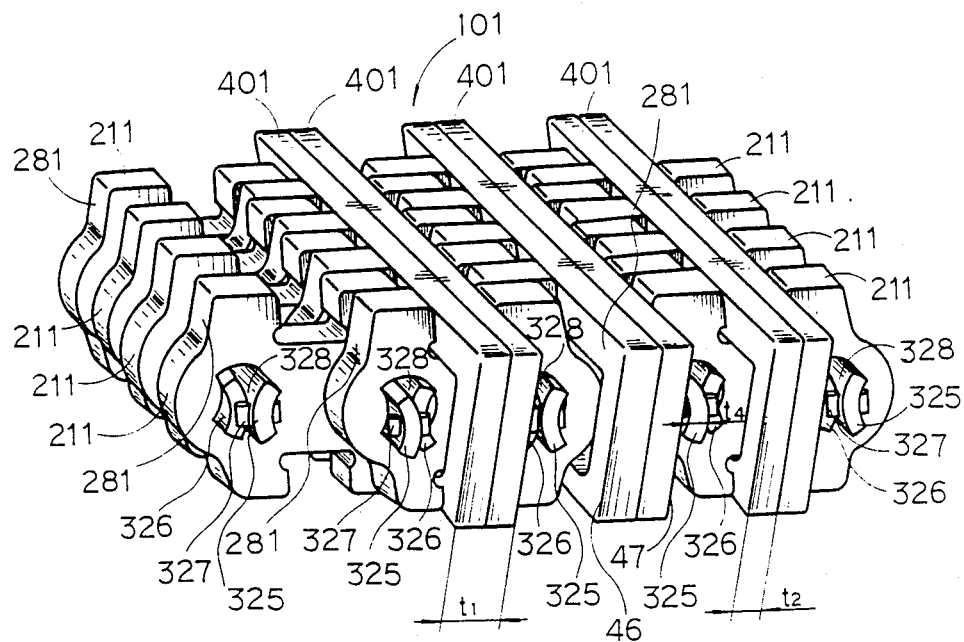
FIG. 29 is an enlarged perspective view of a chain belt of a fifth embodiment according to the present invention.
Figure 30:
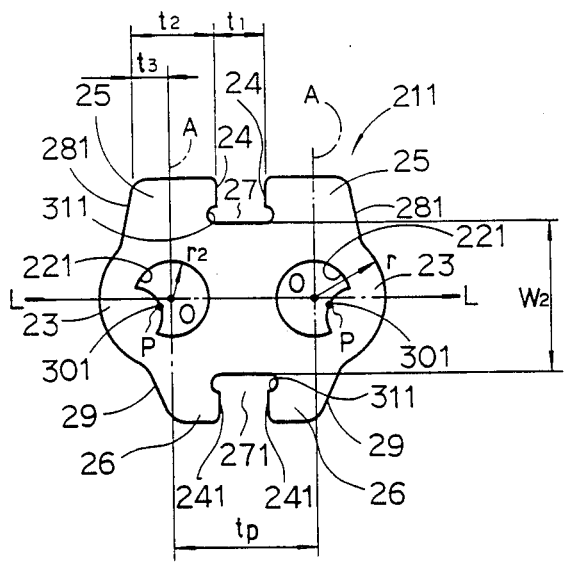
FIG. 30 is an enlarged plan view of a link of the fifth embodiment.
Figure 31:
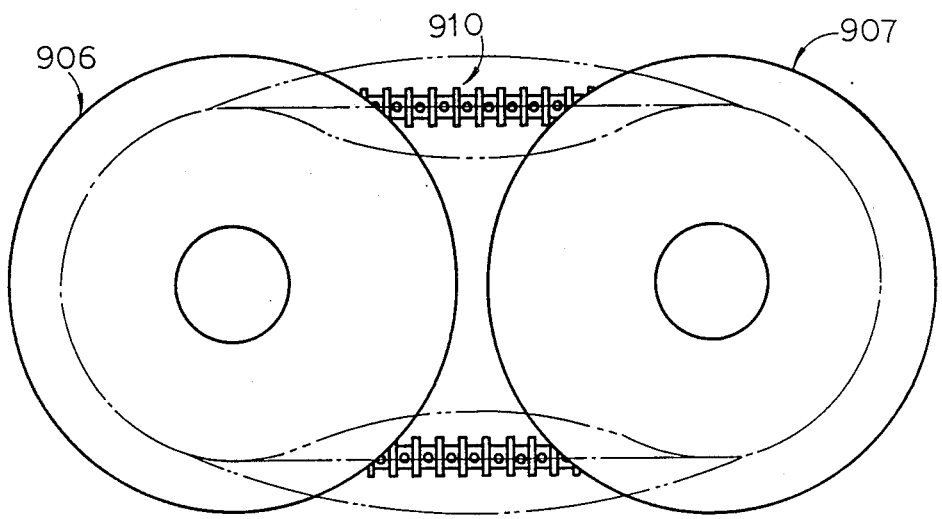
FIG. 31 is an enlarged side view of a continuously variable transmission, wherein a conventional chain belt spans between the input and output pulleys.

FIGS. 29 and 30 show a fifth embodiment of a chain belt 101. The fifth embodiment is similar to the third embodiment disclosed in FIGS. 21 through 23. However, as shown in FIG. 30, a fifth link 211 includes a second inclined contacting edge 281 on the outer projection 25. The inclined outer contacting edge 281 is inclined toward the first inner contacting edge 24 of the outer projection 25 by an angle of 15 degrees. The first inclined contacting edge 29 of the inner projection 26 is also inclined toward the second inner contacting edge 241 by an angle of 15 degrees. However, the second inclined contacting edge 281 of the outer projection 25 projects more than the first inclined contacting surface 29 of the inner projection 26 in the longitudinal direction L—L of the fifth link 211. A third distance "$t_3$", defined between the vertical line "A" and a top end of the second inclined contacting edge 281, is determined by a fifth formula as follows:

$$t_3 \geq r_2 \qquad (5),$$

wherein "$r_2$" is a half diameter of the aperture 221 of the fifth link 211.

Accordingly, in the assembled condition, when the chain belt 101 extends along the longitudinal direction L—L of the fifth link 211, a space is defined between the second inclined contacting edge 281 of the outer projection 25 of the fifth link 211 and the first or second contacting surface 46 or 47 of a third V-shape block 401. As a result, the chain belt 101 can bend downwardly by a predetermined amount, but the predetermined amount of downward bending of the chain belt 101 is less than an amount of the upward bending of the chain belt 101. Therefore, even when the chain belt 101 rotates with the input and output pulleys 906 and 907, an amplitude of the oscillation of the chain belt is smaller than that of the conventional chain belt.

Further, the fifth link 211 includes the notches 311 and the projections 301. The notches 311 are located at the bottom corners of the first and second recesses 27 and 271. The notches 311 extend in the longitudinal direction L—L of the fifth link 211. Openings of the notches 311 of the first recess 27 face each other and openings of the notches 311 of the second recess 271 also face each other. The first and second inner contacting edges 24 and 241 are spaced apart from each other, respectively, by a distance "$t_1$". The projections 301 project from the end portions 23 of the fifth link 211 toward the center "O" of the apertures 221. The projection 301 has a rounded-shape and the most projecting point "P" of the projection 301 is located below the longitudinal line L—L of the fifth link 211.

The third V-shape block 401 has a thickness "$t_1/2$" and the third V-shape block 401 does not have the chamfers on the horizontal beams 43 thereof. Accordingly, the horizontal beams 43 of two third V-shape block 401 are inserted into the first and second recesses 27 and 271.

The first locker pin 325 and the second locker pin 326 are inserted into the apertures 221 of the fifth links 211. The first and second locker pins 325 and 326 have arcuate cross-sectional shapes and one of the first or second locker pin 325 or 326 engages with the rounded projection 301 of the fifth link 211. The first and second locker pins 325 and 326 have respectively the rounded contacting surfaces 328. The rounded contacting surface 328 of the first locker pin 325 slidably contacts the rounded contacting surface 328 of the second locker pin 326. Accordingly, the fifth links 211, engaged with the first locker pin 325, can rotate about the center "O" of the aperture 221 and the fifth links 211, engaged with the second locker pin 326, can rotate also about the center "O" of the aperture 221. The thickness "$t_4$" of the first or second locker pin 325 or 326 is substantially the same as the distance between the center "O" of the aperture 221 and the most projecting point "P" of the rounded projection 301 of the fifth link 211.

Furthermore, in the assembled condition, both ends of the first and second locker pins 325 and 326 respectively project from the fifth links 211. The first locker pin 325 has a hole provided in each end thereof. A longitudinal distance between the holes of the first locker pin 325 is longer than the length of the second locker pin 326. The fastener 327 engages with the holes of the first locker pin 325 and the fastener 327 projects from the rounded contacting surface 328 of the first locker pin 325. Accordingly, the faster 327 prevents the second locker pin 326 from dropping out from the apertures 221 of the fifth link 211.

When the first locker pin 325 slides in the apertures 221 in the longitudinal direction of the first locker pins 325, the fastener 327 can be in contact with the rounded projection 301 of the fifth link 211, such that the fastener 327 prevents the first locker pin 325 from dropping out from the apertures 221 of the fifth link 211.

It will be apparent to those skill in the art that the first locker pin 325 can be secured to one of the fifth link 211 and that the second locker pin 326 can be secured to the another of the fifth link 211 instead of using the fastener 327.

As described herein, the present invention overcomes the shortcomings of the known art by providing a chain belt which can prevent itself from bending downwardly more than a predetermined amount.

While the present invention has been described in its preferred embodiments, it is to be understood that the invention is not limited thereto, and may be otherwise embodied within the scope of the following claims.

What is claimed is:

1. A chain belt comprising:
   a plurality of V-shape blocks, each of said V-shape blocks having a pair of lateral side surfaces, a first contacting surface and a second contacting surface, said first and second contacting surfaces extending between the pair of lateral side surfaces on opposite sides of the V-shape block, said V-shape block having an opening therein which extends through the first and second contacting surfaces;
   means for connecting the V-shape blocks to each other and forming a continuous loop, the continuous loop formed by the V-shape blocks and the connecting means spanning between two pulleys, some of the V-shape blocks being in contact with each of two pulleys, the other V-shape blocks being apart from the two pulleys, said connecting means comprising: a plurality of links positioned within said V-shape blocks such that at least one link is positioned within each V-shape block, each of said links having a first end with a first aperture therethrough, a second end with a second aperture therethrough, an intermediate portion between said first and second ends, and at least one outer projection laterally extending from one of the ends thereof, said outer projection having a first contacting edge and a second contacting edge located on opposite sides thereof, the first contacting edge being parallel with the second contacting edge; and a plurality of pins for fastening the links to each other, said pins being inserted in the apertures in the ends of the links;
   wherein said links are positioned within said V-shape blocks such that the intermediate portion of each link is located in the opening of one V-shape block and the ends are located on opposite sides of the V-shape block, and said V-shape blocks are connected such that the first contacting surface of one V-shape block contacts with the first contacting edge of the outer projection of the link, and the second contacting surface of an adjacent V-shape block contacts with the second contacting edge of the outer projection of the link when adjacent V-shape blocks are positioned between and apart from the two pulleys, and the first contacting surface of one V-shape block is juxtaposed with the second contacting surface of an adjacent V-shape block;
   whereby contact between the first and second contacting edges of the outer projections of the links and the first and second surfaces of the V-shape blocks prevents a portion of the continuous loop of the chain belt, which is positioned between and apart from the two pulleys, from bending downwardly.

2. The chain belt of claim 1, wherein the link further comprises an inner projection, the inner projection projecting inwardly in the lateral direction of the link from one of the ends of the link toward an inside of the continuous loop, the inner projection including a third contacting edge and a fourth contacting edge.

3. The chain belt of claim 2, wherein the fourth contacting edge of the inner projection of the link is inclined toward the third contacting edge of the inner projection of the link.

4. The chain belt of claim 3, wherein the first contacting edge of the outer projection of the link is aligned with the third contacting edge of the inner projection of the link.

5. The chain belt of claim 4, wherein the first and third contacting edges are perpendicular to a line passing through the centers of the apertures in the ends of the link.

* * * * *